US009076090B2

(12) United States Patent
Anzalone

(10) Patent No.: US 9,076,090 B2
(45) Date of Patent: Jul. 7, 2015

(54) CARD HAVING STRUCTURE FOR DETACHING AND ATTACHING TO ANOTHER CARD

(76) Inventor: Michael Joseph Anzalone, Centereach, NY (US)

( * ) Notice: Subject to any disclaimer, the term of this patent is extended or adjusted under 35 U.S.C. 154(b) by 159 days.

(21) Appl. No.: 13/524,112

(22) Filed: Jun. 15, 2012

(65) Prior Publication Data

US 2013/0299594 A1   Nov. 14, 2013

Related U.S. Application Data

(60) Provisional application No. 61/645,846, filed on May 11, 2012.

(51) Int. Cl.
*G06K 19/00* (2006.01)
*G06K 19/04* (2006.01)
*B42D 25/00* (2014.01)

(52) U.S. Cl.
CPC .......... *G06K 19/041* (2013.01); *B42D 2033/42* (2013.01); *B42D 25/00* (2014.01)

(58) Field of Classification Search
CPC .................................................. G06K 19/077
USPC ........................... 235/379, 487, 492, 493, 494
See application file for complete search history.

(56) References Cited

U.S. PATENT DOCUMENTS

| 3,511,181 | A | * | 5/1970 | Speer, Jr. et al. | 283/98 |
| 3,605,619 | A | * | 9/1971 | Gilstrap | 283/98 |
| 5,883,377 | A | | 3/1999 | Chapin, Jr. | |
| 6,012,636 | A | | 1/2000 | Smith | |
| 6,138,917 | A | | 10/2000 | Chapin | |
| 6,394,343 | B1 | * | 5/2002 | Berg et al. | 235/379 |
| 6,793,141 | B1 | | 9/2004 | Graham | |
| 7,213,764 | B2 | | 5/2007 | Lasch et al. | |
| 7,370,805 | B2 | | 5/2008 | Smith et al. | |
| 7,374,095 | B2 | * | 5/2008 | Blank et al. | 235/380 |
| 8,186,599 | B2 | * | 5/2012 | Fleischer et al. | 235/492 |
| 8,272,565 | B2 | * | 9/2012 | Halbur et al. | 235/487 |
| 2007/0251994 | A1 | | 11/2007 | Kingsborough et al. | |
| 2009/0037275 | A1 | | 2/2009 | Pollio | |

FOREIGN PATENT DOCUMENTS

FR    2 747 811 A1   10/1997
GB    2 116 480 A    9/1983

OTHER PUBLICATIONS

PCT International Search Report and Written Opinion mailed Sep. 3, 2013 for PCT/US2013/040754.
PCT International Report on Patentability dated Nov. 11, 2014 for PCT/US2013/040754.

* cited by examiner

*Primary Examiner* — Jamara Franklin
(74) *Attorney, Agent, or Firm* — Carter, DeLuca, Farrell & Schmidt, LLP

(57) ABSTRACT

A card is provided having structure, such as a teeth-like pattern, tongue and groove, etc., along at least one edge thereof. The structure is configured for matching or mating with a corresponding similar pattern along at least one edge of another card for selectively attaching and detaching the two cards. The card can be a credit card or other type of card having at least one magnetic stripe for effecting payment for purchases. The card can also be other types of cards, such as gift cards, library cards, identification cards, etc.

20 Claims, 16 Drawing Sheets

CARD HAVING STRUCTURE FOR DETACHING AND ATTACHING TO ANOTHER CARD

PRIORITY

The present application claims priority to a U.S. Provisional Patent Application filed on May 11, 2012, titled "ZipperCard™: Card Having Pattern for Detaching and Attaching to Another Card," and assigned U.S. Provisional Application Ser. No. 61/645,846, the entire contents of which are incorporated herein by reference.

SUMMARY

A card is provided having structure, such as a teeth-like pattern, tongue and groove, etc., along at least one edge thereof. The structure in one embodiment is configured for matching or mating with a corresponding similar pattern along at least one edge of another card for selectively attaching and detaching the two cards. In another embodiment, the structure includes, on one side, protrusions which form concave formations, such as dimples, on the other side. The protrusions on one card are configured to mate with corresponding concave formations on the other card to attach the two cards.

In another embodiment, the structure includes a lip for mating with or interlocking with a corresponding lip on the other card. In still another embodiment, the structure includes a horizontal protrusion which mates with a groove formed on the underside of a similarly-shaped protrusion on the other card. In yet another embodiment, the structure includes a strip of VELCRO® (generically, a fabric hook and loop fastener) or other similar structure applied in proximity to at least one edge of each card. Other embodiments for the structure can be envisioned by one of ordinary skill in the art in accordance with the teachings of the present disclosure.

It is also envisioned to use an adhesive for attaching the two cards to each other. The adhesive can be of the type which enables the two cards to be attached and detached many times before the adhesive loses its adhesiveness property.

A computer readable medium, such as, for example, at least one magnetic stripe and/or other indicia (UPC code, bar code, matrix barcode, three-dimensional code, etc.) capable of being read by a card reader or other type of reader, such as an RFID tag capable of being read by an RFID reader, a near field communication (NFC) chip or any other type of chip, are provided on the card. Accordingly, the card can be a payment-type card to be used for effecting payment using a payment account, such as a post-paid or prepaid payment account. The payment account can be, for example, a bank account, a credit card account, or a pre-funded electronic account. These accounts can store funds therein (as in the form of a bank ledger account) or can be capable of obtaining funds from a third party source, such as, for example, in the case of a credit card account, from a financial institution.

Hence, as known in the art, the magnetic stripe or other indicia stores data, such as, for example, a credit card account, user name, bank name, account balance, etc. Each card can be used for effecting payment, such as, for example, at a point-of-sale terminal, while attached or not attached to another card. That is, the card according to the present disclosure can be used for making purchases by using a point-of-sale terminal, such as swiping or reading the card while attached or not attached to another card. The point-of-sale terminal can be, for example, a magnetic stripe reader, a smartphone, a bar code scanner, an imaging apparatus, etc.

The card according to the present disclosure can be a credit card, debit card, gift card, phone card, parking card, library card, membership card (Costco®, BJ's®, health club, etc.), coupon or discount card (supermarket card), gift/rewards redemption card (storing points or rewards) (e.g., a Dave & Busters™ card), season pass or admissions card (e.g., season pass to amusement parks owned and operated by Six Flags®), laundromat card, car wash card, prepaid cards, prepaid phone calling card, etc.

In a gift card embodiment according to the present disclosure, a gift card having at least one magnetic stripe and/or other indicia can be displayed on a display rack at a store. In this embodiment, the gift card is attached to a segment having at least one opening. The opening is used to hang the card on the display rack. A tear-off configuration separates the segment from the card for separating the segment from the gift card. The tear-off configuration is in the form of a pattern, such as a triangular teeth-like pattern. The pattern can be used to attach the gift card to another gift card or other card having a corresponding pattern. The segment can also include an activation magnetic stripe which is used to activate the gift card, such as, for example, at a point-of-sale terminal.

In another gift card embodiment, the two gift cards can be packaged and sold together as one product, either attached along a respective edge of each card or not attached. Each respective edge has structure, such as a teeth-like pattern, in accordance with the teachings of the present disclosure for attaching and detaching the two gift cards. The two gift cards can complement each other, such as, for example, one gift card is for a toy store and the other gift card is for a children's clothing store.

It is contemplated the two cards attached to each other (either by the end user or by the marketer) complement each other, such as, for example, one card is a credit card and the other card is a debit card issued by the same bank; one card is a personal credit card and the other card is a business credit card; and, as described in the preceding paragraph, two gift cards can complement each other, such as, one card is a gift card for a toy store and the other card is a gift card to a children's clothing store.

In accordance with another embodiment, the card can also be an identification card or other similar card designed to be worn by employees or others. In this embodiment, the card is attached and detached to a holder having at least one clip for fastening the holder to an employee's clothing. The holder also has structure, e.g., a teeth-like pattern, along at least one edge for attaching/detaching the holder to the card having corresponding or similar structure, e.g., a teeth-like pattern, along at least one edge.

In still another embodiment, a marking or indicating mechanism is provided on one side of the card for selectively indicating which magnetic stripe to swipe when the card is attached to another card also having magnetic stripe. For example, in a restaurant setting, a customer can hand the waiter two credit cards attached to each other via the structure and use the marking mechanism to indicate to the waiter which credit card or which magnetic stripe to swipe. The marking mechanism can be a pointer, a color-coded indicator, a word marker (for example, the word marker can be selectively moved to read "swipe" or "do not swipe"), etc.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
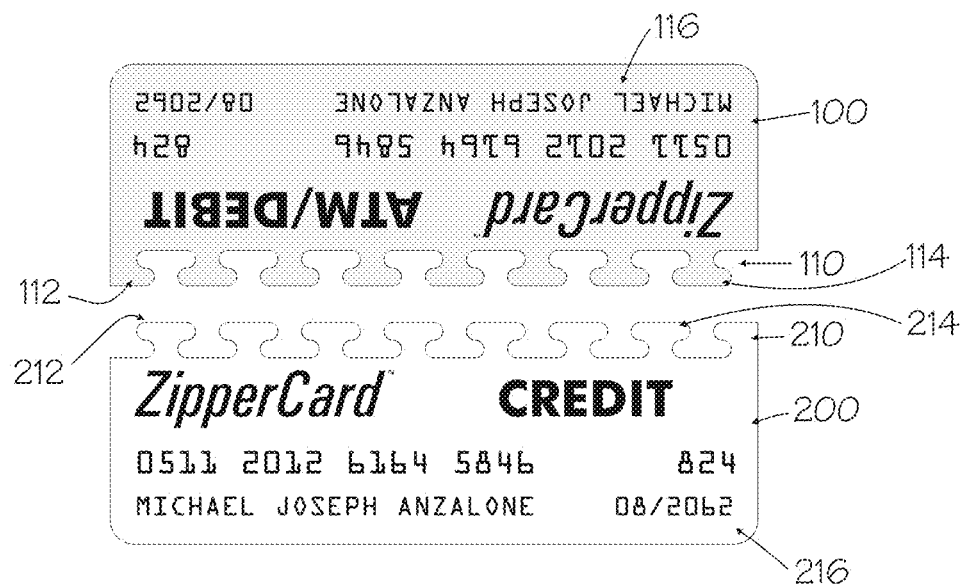
FIG. 1 is a front view of two detached cards each having structure for attaching to and detaching from each other in accordance with a first embodiment according to the present disclosure.

In the Summary section above, in this Detailed Description, in the Claims below, and in the accompanying drawings, reference is made to particular features (including method steps or acts) of the present disclosure. It is to be understood the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

The term "at least" followed by a number is used herein to denote the start of a range beginning with that number (which may be a range having an upper limit or no upper limit, depending on the variable being defined). For example, "at least one" means one or more than one.

As described with reference to the drawings herein below, the present disclosure describes a card having structure, such as a teeth-like pattern, tongue and groove, etc., along at least one edge thereof. The structure in one embodiment according to the present disclosure is configured for matching or mating with a corresponding similar pattern along at least one edge of another card for selectively attaching and detaching the two cards. In another embodiment, the structure includes protrusions or dimples which mate with pockets formed on the underside of the protrusions or dimples on the other card. In another embodiment, the structure includes a lip for mating with or hooking with a corresponding lip on the other card. In still another embodiment, the structure includes a horizontal protrusion which mates with a groove formed on the underside of a protrusion on the other card. In yet another embodiment, the structure includes a strip of VELCRO® (generically, a fabric hook and loop fastener) or other similar structure applied in proximity to at least one edge of each card. Other embodiments for the structure can be envisioned by one of ordinary skill in the art in accordance with the teachings of the present disclosure.

It is also envisioned to use an adhesive for attaching the two cards to each other. The adhesive can be of the type which enables the two cards to be attached and detached many times before the adhesive loses its adhesiveness property.

Each card can be dimensioned such that when attached to another card, the dimension of the combined cards is similar to the dimension of conventional debit and credit cards, and other types of cards, to maintain compatibility with existing card readers and other card reading infrastructure.

A computer readable medium, such as, for example, at least one magnetic stripe and/or other indicia (UPC code, bar code, matrix barcode, three-dimensional code, etc.) capable of being read by a card reader or other type of reader, such as an RFID tag capable of being read by an RFID reader, a near field communication (NFC) chip or any other type of chip, are provided on the card. Accordingly, the card can be a payment-type card to be used for effecting payment using a payment account, such as a post-paid or prepaid payment account. The payment account can be, for example, a bank account, a credit card account, or a pre-funded electronic account. These accounts can store funds therein (as in the form of a bank ledger account) or can be capable of obtaining funds from a third party source, such as, for example, in the case of a credit card account, from a financial institution.

Hence, as known in the art, the magnetic stripe or other indicia stores data, such as, for example, a credit card account, user name, bank name, account balance, etc. Each card can be used for effecting payment, such as, for example, at a point-of-sale terminal, while attached or not attached to another card. That is, the card according to the present disclosure can be used for making purchases by using a point-of-sale terminal, such as swiping or reading the card while attached or not attached to another card. The point-of-sale terminal can be, for example, a magnetic stripe reader, a smartphone, a bar code scanner, an imaging apparatus, etc.

The card according to the present disclosure can be a credit card (as shown by FIGS. 1-21 and 28-30), debit card, gift card (as shown by FIGS. 22-26), phone card, parking card, library card, membership card (Costco®, BJ's®, health club, etc.), coupon or discount card (supermarket card), gift/rewards redemption card (storing points or rewards) (e.g., a Dave & Busters™ card), season pass or admissions card (e.g., season pass to amusement parks owned and operated by Six Flags®), laundromat card, car wash card, prepaid cards, prepaid phone calling card, etc. The thickness of the cards described herein can be in accordance with ISO/IEC 7810 or other international standard.

In a gift card embodiment according to the present disclosure, a gift card having at least one magnetic stripe and/or other indicia can be displayed on a display rack at a store. In this embodiment, the gift card is attached to a segment having at least one opening. The opening is used to hang the card on the display rack. A tear-off configuration separates the segment from the card for separating the segment from the gift card. The tear-off configuration is in the form of a pattern, such as a triangular teeth-like pattern. The pattern can be used to attach the gift card to another gift card or other card having a corresponding pattern. The segment can also include an activation magnetic stripe which is used to activate the gift card, such as, for example, at a point-of-sale terminal.

In another gift card embodiment, the two gift cards can be packaged and sold together as one product, either attached along a respective edge of each card or not attached. Each respective edge has structure, such as a teeth-like pattern, in accordance with the teachings of the present disclosure for attaching and detaching the two gift cards. The two gift cards can complement each other, such as, for example, one gift card is for a toy store and the other gift card is for a children's clothing store, or one gift card is for a men's store and the other gift card is for a women's store.

Along the same lines, it is contemplated the two cards attached to each other (either by the end user or by the marketer) complement each other, such as, for example, one card is a credit card and the other card is a debit card issued by the same bank; one card is a personal credit card and the other card is a business credit card; and, as described in the preceding paragraph, two gift cards can complement each other, such as, one card is a gift card for a toy store and the other card is a gift card to a children's clothing store, or one gift card is for a men's store and the other gift card is for a women's store.

In accordance with another embodiment, the card can also be an identification card (FIG. 27) or other similar card designed to be worn by employees or others. In this embodiment, the card is attached and detached to a holder having at least one clip for fastening the holder to an employee's clothing. The holder also has structure, e.g., a teeth-like pattern, along at least one edge for attaching/detaching the holder to the card having corresponding or similar structure, e.g., a teeth-like pattern, along at least one edge.

In still another embodiment, a marking or indicating mechanism is provided on one side of the card for selectively indicating which magnetic stripe to swipe when the card is attached to another card also having magnetic stripe. For example, in a restaurant setting, a customer can hand the waiter two credit cards attached to each other via the structure and use the marking mechanism to indicate to the waiter which credit card or which magnetic stripe to swipe. The marking mechanism can be a pointer, a color-coded indicator, a word marker (for example, the word marker can be selectively moved to read "swipe" or "do not swipe"), etc.

Figure 2:
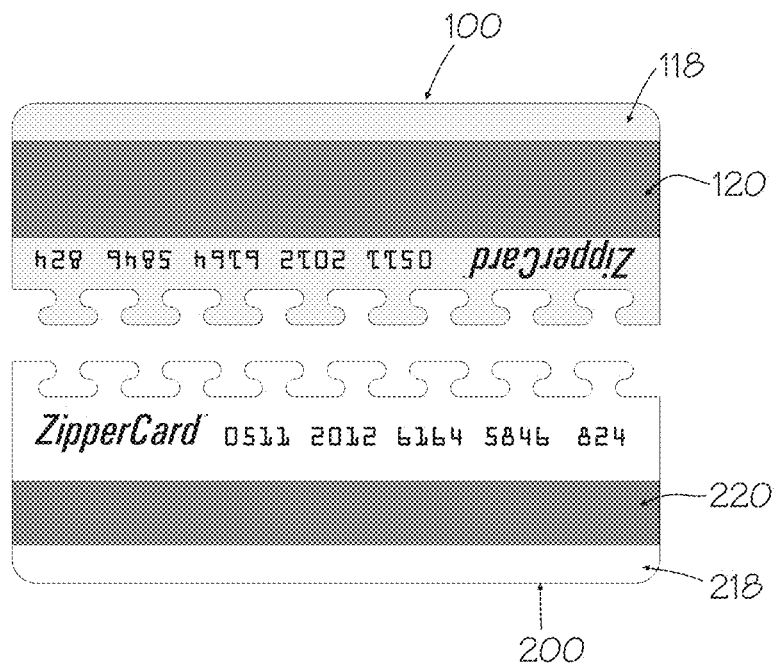
FIG. 2 is a back view of the two detached cards shown in FIG. 1.
Figure 3:
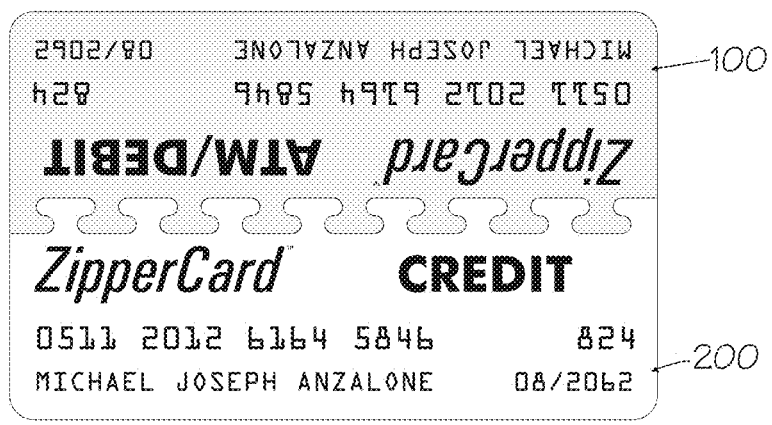
FIG. 3 is a front view of the two cards shown in FIGS. 1 and 2 attached.
Figure 4:
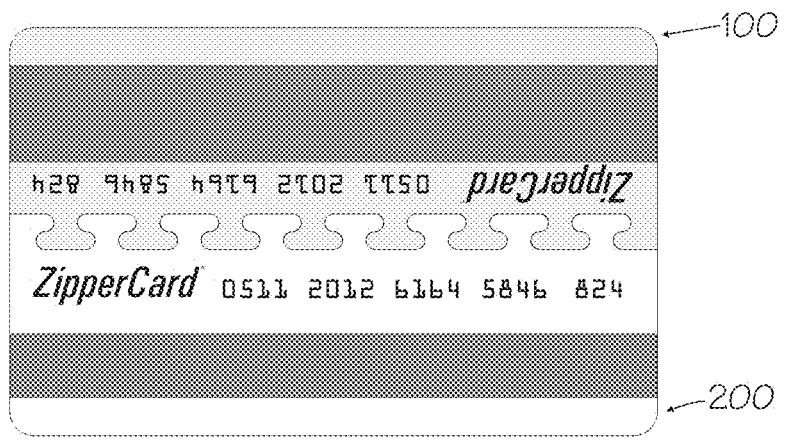
FIG. 4 is a back view of the two cards shown in FIGS. 1 and 2 attached.

With reference to FIGS. 1 and 2, there are shown, respectively, front and back views of two detached cards each having structure for attaching to and detaching from each other in accordance with a first embodiment. In FIGS. 1 and 2, the top card is identified by reference numeral 100 and the bottom card is identified by reference numeral 200. Each card has structure 110, 210 along at least one edge 112, 212. The structure 110 on the top card 100 includes structural members 114 configured to mate with corresponding structural members 214 of the structure 210 of the bottom card 200 to attach the two cards 100, 200 as shown by FIGS. 3 and 4. The cards 100, 200 can be selectively detached by un-mating the structural members 114, 214.

FIGS. 1 and 3 show a front side 116, 216 of the cards 100, 200, and FIGS. 2 and 4 show a back side 118, 218 of the cards 100, 200. The back side 118, 218 of the cards 100, 200 includes at least one magnetic stripe 120, 220 storing data capable of being read by a point-of-sale terminal, such as swiping or reading one of the two cards 100, 200 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on the front side 116, 216 of the cards 100, 200 as shown by FIGS. 1 and 3. The front side 116, 216 can also include the name of the issuing financial institution.

Figure 5:
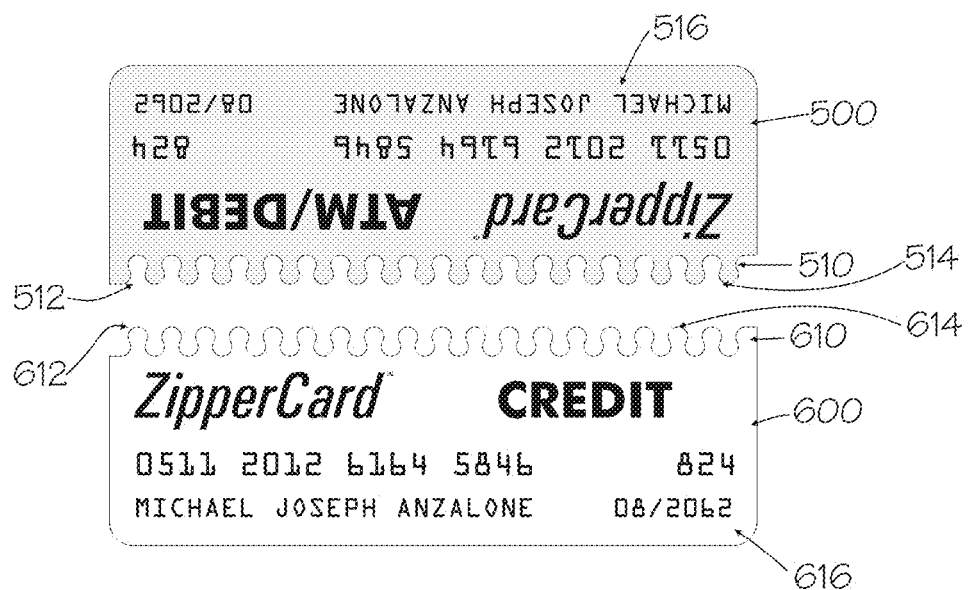
FIG. 5 is a front view of two detached cards each having structure for attaching to and detaching from each other in accordance with a second embodiment according to the present disclosure.
Figure 6:
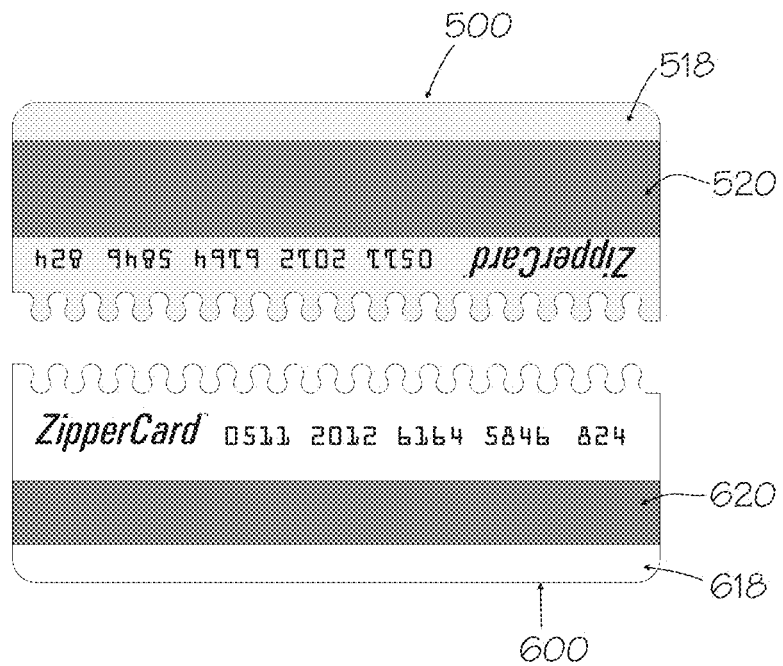
FIG. 6 is a back view of the two detached cards shown in FIG. 5.
Figure 7:
FIG. 7 is a front view of the two cards shown in FIGS. 5 and 6 attached.
Figure 8:
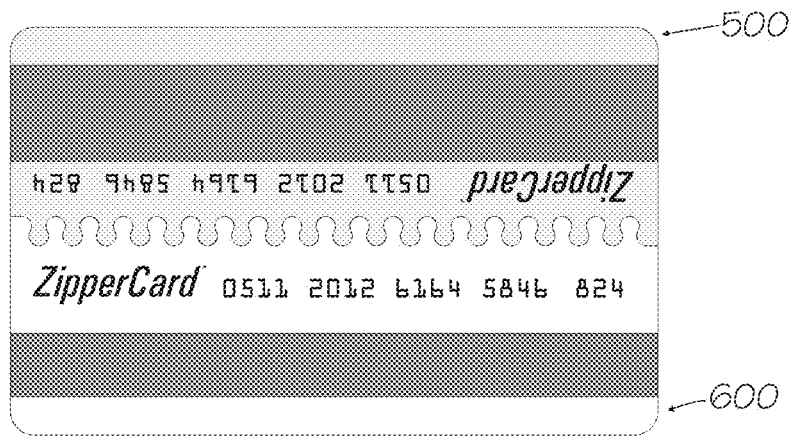
FIG. 8 is a back view of the two cards shown in FIGS. 5 and 6 attached.

With reference to FIGS. 5 and 6, there are shown, respectively, front and back views of two detached cards each having structure for attaching to and detaching from each other in accordance with a second embodiment. In FIGS. 5 and 6, the top card is identified by reference numeral 500 and the bottom card is identified by reference numeral 600. Each card has structure 510, 610 along at least one edge 512, 612. The structure 510 on the top card 500 includes structural members 514 configured to mate with corresponding structural members 614 of the structure 610 of the bottom card 600 to attach the two cards 500, 600 as shown by FIGS. 7 and 8. The cards 500, 600 can be selectively detached by un-mating the structural members 514, 614.

FIGS. 5 and 7 show a front side 516, 616 of the cards 500, 600, and FIGS. 6 and 8 show a back side 518, 618 of the cards 500, 600. The back side 518, 618 of the cards 500, 600 includes at least one magnetic stripe 520, 620 storing data capable of being read by a point-of-sale terminal, such as swiping or reading one of the two cards 500, 600 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on the front side 516, 616 of the cards 500, 600 as shown by FIGS. 5 and 7. The front side 516, 616 can also include the name of the issuing financial institution.

Figure 9:
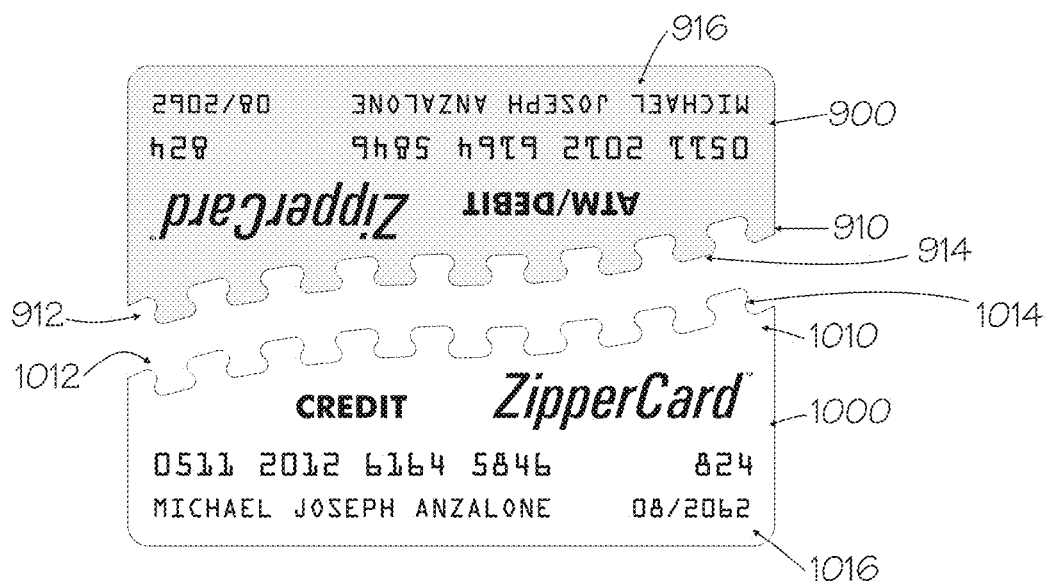
FIG. 9 is a front view of two detached cards each having structure for attaching to and detaching from each other in accordance with a third embodiment according to the present disclosure.
Figure 10:
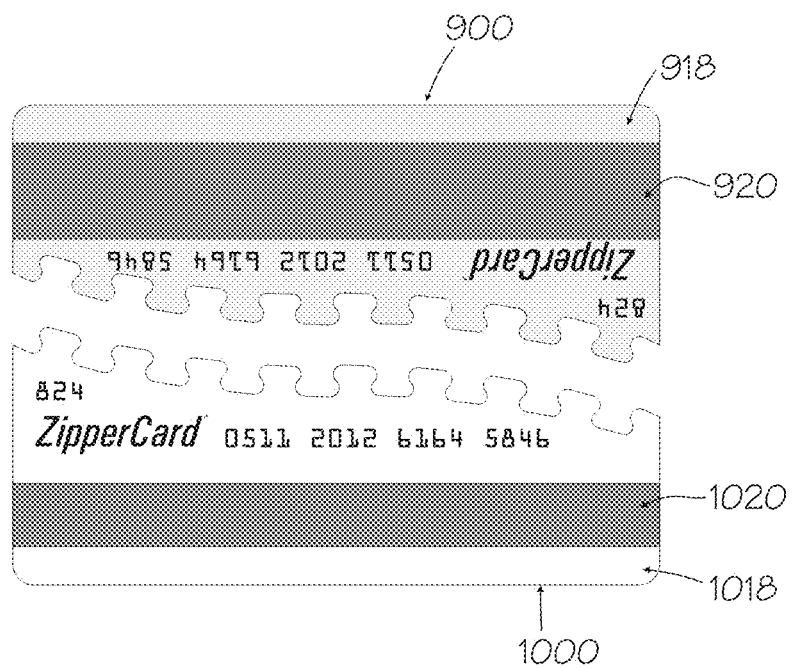
FIG. 10 is a back view of the two detached cards shown in FIG. 9.
Figure 11:
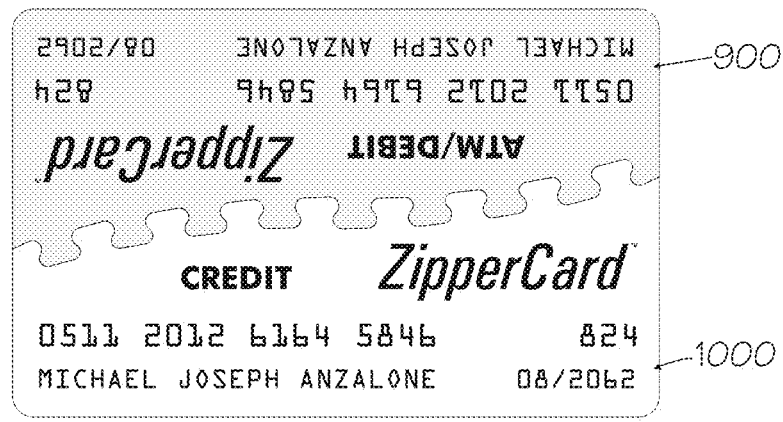
FIG. 11 is a front view of the two cards shown in FIGS. 9 and 10 attached.
Figure 12:
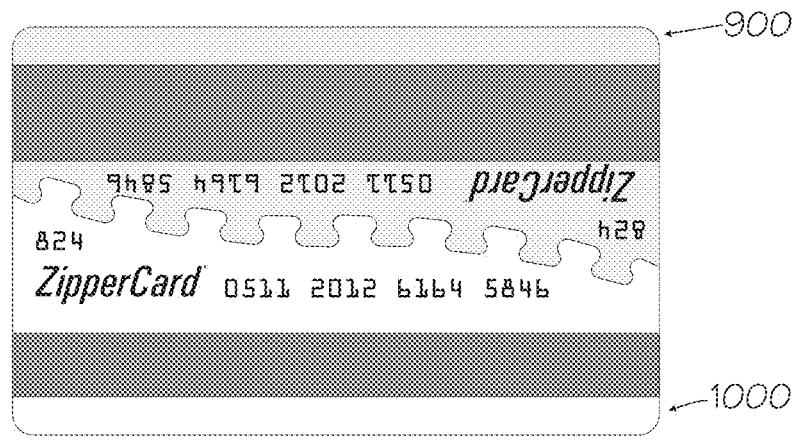
FIG. 12 is a back view of the two cards shown in FIGS. 9 and 10 attached.

With reference to FIGS. 9 and 10, there are shown, respectively, front and back views of two detached cards each having structure for attaching to and detaching from each other in accordance with a third embodiment. In FIGS. 9 and 10, the top card is identified by reference numeral 900 and the bottom card is identified by reference numeral 1000. Each card has structure 910, 1010 along at least one edge 912, 1012. The structure 910 on the top card 900 includes structural members 914 in a curved pattern configured to mate with corresponding structural members 1014 of the structure 1010 of the bottom card 1000 to attach the two cards 900, 1000 as shown by FIGS. 11 and 12. The cards 900, 1000 can be selectively detached by un-mating the structural members 914, 1014.

FIGS. 9 and 11 show a front side 916, 1016 of the cards 900, 1000, and FIGS. 10 and 12 show a back side 918, 1018 of the cards 900, 1000. The back side 918, 1018 of the cards 900, 1000 includes at least one magnetic stripe 920, 1020 storing data capable of being read by a point-of-sale terminal, such as swiping or reading one of the two cards 900, 1000 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on the front side 916, 1016 of the cards 900, 1000 as shown by FIGS. 9 and 11. The front side 916, 1016 can also include the name of the issuing financial institution.

Figure 13:
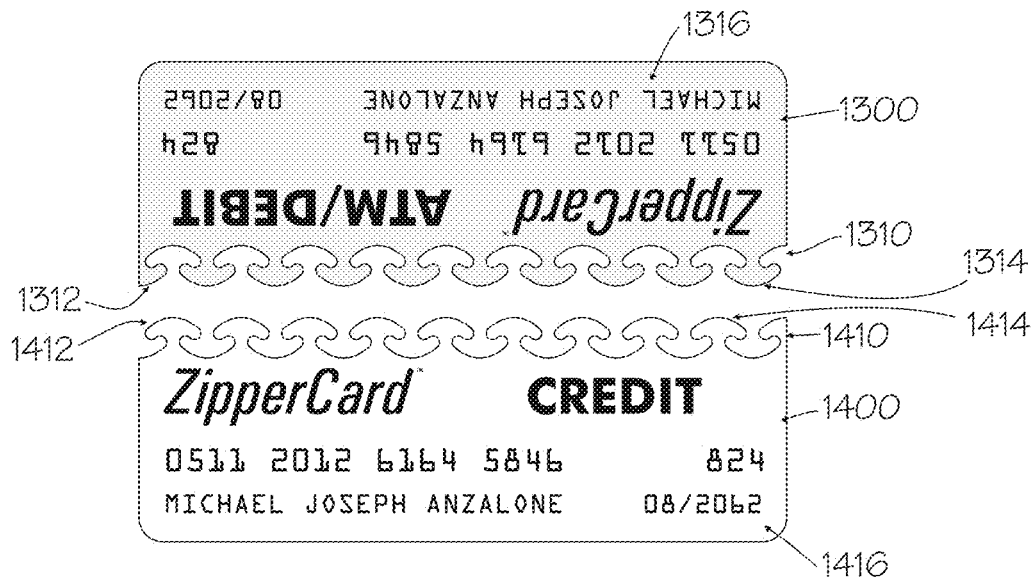
FIG. 13 is a front view of two detached cards each having structure for attaching to and detaching from each other in accordance with a fourth embodiment according to the present disclosure.
Figure 14:
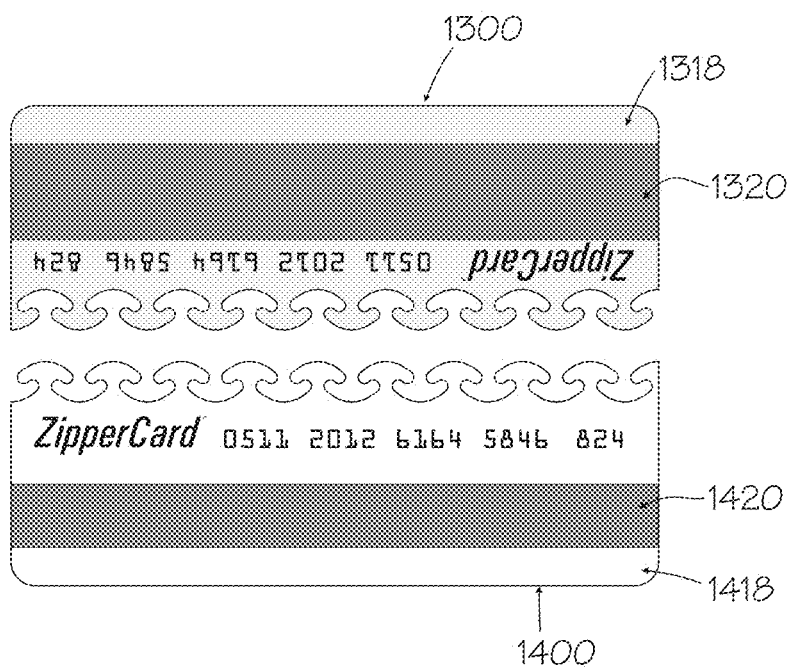
FIG. 14 is a back view of the two detached cards shown in FIG. 13.
Figure 15:
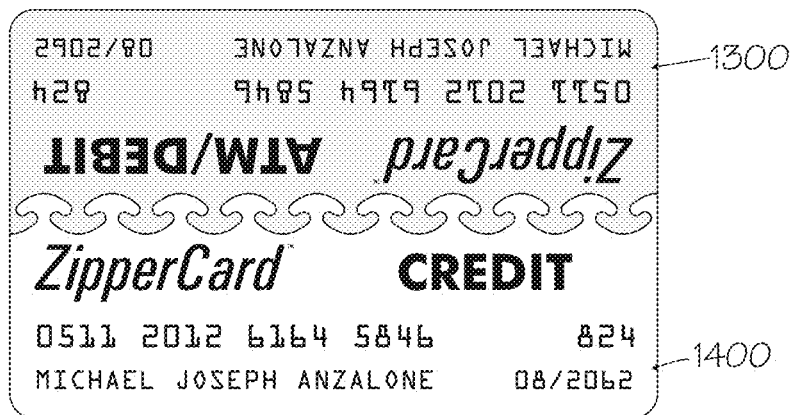
FIG. 15 is a front view of the two cards shown in FIGS. 13 and 14 attached.
Figure 16:
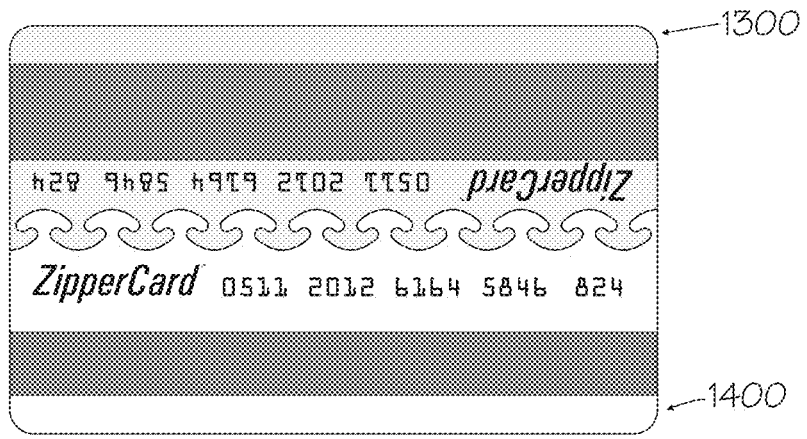
FIG. 16 is a back view of the two cards shown in FIGS. 13 and 14 attached.

With reference to FIGS. 13 and 14, there are shown, respectively, front and back views of two detached cards each having structure for attaching to and detaching from each other in accordance with a fourth embodiment. In FIGS. 13 and 14, the top card is identified by reference numeral 1300 and the bottom card is identified by reference numeral 1400. Each card has structure 1310, 1410 along at least one edge 1312, 1412. The structure 1310 on the top card 1300 includes structural members 1314 configured to mate with corresponding structural members 1414 of the structure 1410 of the bottom card 1400 to attach the two cards 1300, 1400 as shown by FIGS. 15 and 16. The cards 1300, 1400 can be selectively detached by un-mating the structural members 1314, 1414.

FIGS. 13 and 15 show a front side 1316, 1416 of the cards 1300, 1400, and FIGS. 14 and 16 show a back side 1318, 1418 of the cards 1300, 1400. The back side 1318, 1418 of the cards 1300, 1400 includes at least one magnetic stripe 1320, 1420 storing data capable of being read by a point-of-sale terminal, such as swiping or reading one of the two cards 1300, 1400 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on the front side 1316, 1416 of the cards 1300, 1400 as shown by FIGS. 13 and 15. The front side 1316, 1416 can also include the name of the issuing financial institution.

Figure 17:
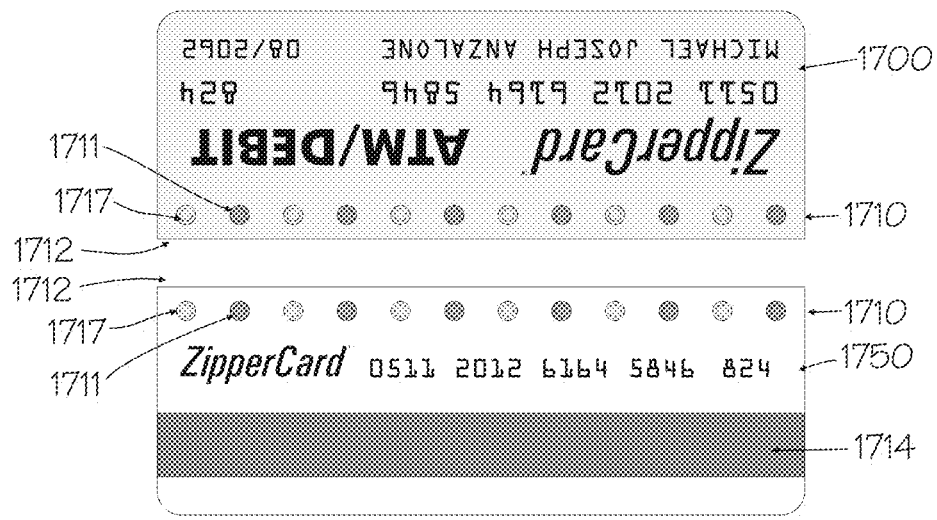
FIG. 17 is a front view of one card and a back view of another card each having semi-circular protrusions (dark circles) with alternating semi-circular pockets (light circles) for mating with each other for attaching the cards in accordance with a fifth embodiment according to the present disclosure.

With reference to FIG. 17, there are shown front and back views of two detached cards each having structure for attaching to and detaching from each other in accordance with a fifth embodiment. In FIG. 17, the top card is identified by reference numeral 1700 and the bottom card is identified by reference numeral 1750. Each card has structure 1710 in proximity to at least one edge 1712. The structure 1710 on each card includes, semi-circular protrusions (shown as dark circles in FIG. 17) 1711 with alternating semi-circular pockets or concave formations, such as dimples, (shown as light circles in FIG. 17) 1717 for mating with each other for attaching the cards. The protrusions 1711 and alternating pockets 1717 on the top card 1700 are configured to mate respectively with corresponding pockets 1717 and protrusions 1711 on the bottom card 1750 to attach the two cards 1700, 1750. The cards 1700, 1750 can be selectively detached by un-mating the structural members protrusions 1711 from the concave formations 1717.

As with other embodiments described herein, one side of the cards 1700, 1750 includes at least one magnetic stripe 1714 storing data capable of being read by a point-of-sale terminal, such as swiping or reading one of the two cards 1700, 1750 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on a front side of the cards 1700, 1750 as shown by FIG. 17. The front side can also include the name of the issuing financial institution.

Figure 18:
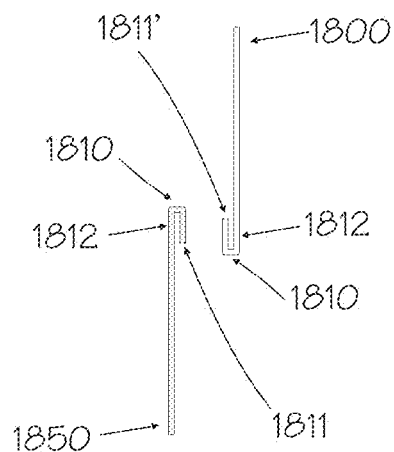
FIG. 18 is side view of one card and a side view of another card each having a lip for mating with each other for attaching the cards in accordance with a sixth embodiment according to the present disclosure.

With reference to FIG. 18, there are shown front and back views of two detached cards each having structure for attaching to and detaching from each other in accordance with a sixth embodiment. In FIG. 18, the top card is identified by reference numeral 1800 and the bottom card is identified by reference numeral 1850. Each card has structure 1810 in proximity or along at least one edge 1812. The structure 1810 on each card includes a lip 1811 configured to interlock with a lip 1811' of the other card to attach the two cards 1800, 1850. The cards 1800, 1850 can be selectively detached by unlocking lip 1811 from lip 1811'.

As with other embodiments described herein, one side of the cards 1800, 1850 includes at least one magnetic stripe (not shown) storing data capable of being read by a point-of-sale terminal, such as swiping or reading one of the two cards 1800, 1850 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on a front side of the cards 1800, 1850 as shown by FIG. 18. The front side can also include the name of the issuing financial institution.

Figure 19:
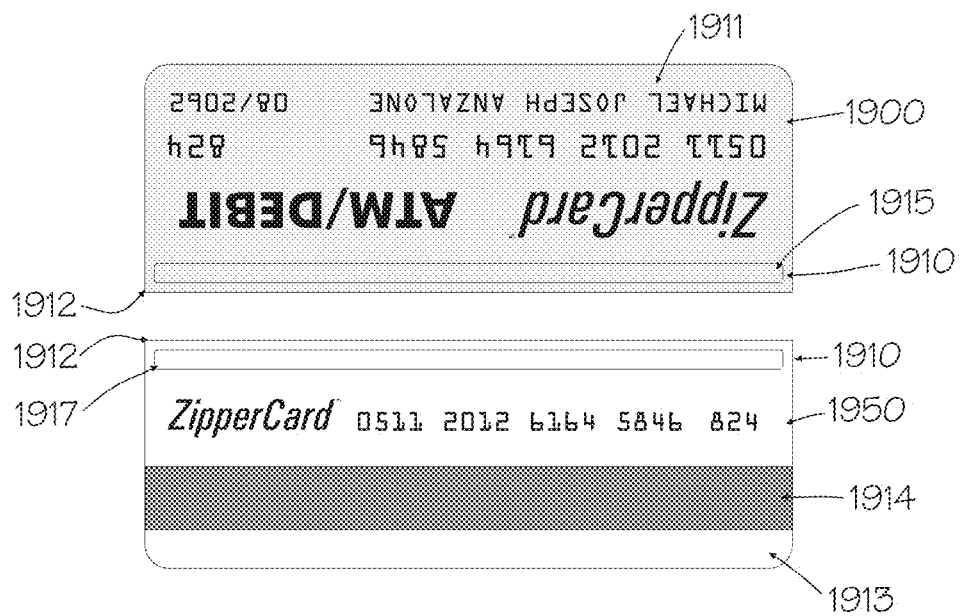
FIG. 19 is a front view of one card and a back view of another card each having a horizontal protrusion on a front side forming a horizontal pocket on the back side for mating with each other for attaching the cards in accordance with a seventh embodiment according to the present disclosure.

With reference to FIG. 19, there are shown front and back views of two detached cards each having structure for attaching to and detaching from each other in accordance with a seventh embodiment. In FIG. 19, the top card is identified by reference numeral 1900 and the bottom card is identified by reference numeral 1950. Each card has structure 1910 in proximity to at least one edge 1912. The structure 1910 on each card includes, on one side 1911, a horizontal protrusion 1915 which forms a concave or groove formation 1917 on the other side 1913 of the card. The protrusion 1915 on the top card 1900 is configured to mate with the corresponding concave formation 1917 on the bottom card 1950 to attach the two cards 1900, 1950. The cards 1900, 1950 can be selectively detached by un-mating the protrusion 1915 from the concave formation 1917.

As with other embodiments described herein, one side of the cards 1900, 1950 includes at least one magnetic stripe 1914 storing data capable of being read by a point-of-sale terminal, such as swiping or reading one of the two cards 1900, 1950 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on a front side of the cards 1900, 1950 as shown by FIG. 19. The front side can also include the name of the issuing financial institution.

Figure 20:
FIG. 20 is a front view of one card and a back view of another card each having a strip of material, such as VEL-CRO® (generically, a fabric hook and loop fastener), for attaching the cards in accordance with an eighth embodiment according to the present disclosure.

With reference to FIG. 20, there are shown front and back views of two detached cards each having structure for attaching to and detaching from each other in accordance with an eighth embodiment. In FIG. 20, the top card is identified by reference numeral 2000 and the bottom card is identified by reference numeral 2050. Each card has structure 2010 in proximity to at least one edge 2012. The structure 2010 on each card includes, on one side 2011, a strip of VELCRO® (generically, a fabric hook and loop fastener) 2015 configured to attach to a corresponding strip of VELCRO® (generically, a fabric hook and loop fastener) 2017 on the bottom card 2050 to attach the two cards 2000, 2050. The cards 2000, 2050 can be selectively detached by un-attaching the two strips of VELCRO® (generically, a fabric hook and loop fastener) 2015, 2017.

As with other embodiments described herein, one side of the cards 2000, 2050 includes at least one magnetic stripe 2014 storing data capable of being read by a point-of-sale terminal, such as swiping or reading one of the two cards 2000, 2050 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on a front side of the cards 2000, 2050 as shown by FIG. 20. The front side can also include the name of the issuing financial institution.

Figure 21:
FIG. 21 is a front view of one card and a back view of another card each having a layer of adhesive for attaching the cards in accordance with a ninth embodiment according to the present disclosure.

With reference to FIG. 21, there are shown front and back views of two detached cards each having structure for attaching to and detaching from each other in accordance with a ninth embodiment. In FIG. 21, the top card is identified by reference numeral 2100 and the bottom card is identified by reference numeral 2150. Each card has structure 2110 in proximity to at least one edge 2112. The structure 2110 on each card includes, on one side 2111, a non-permanent adhesive 2115 configured to removably adhere to a corresponding non-permanent adhesive 2117 on the bottom card 2150 to attach the two cards 2100, 2150. The cards 2100, 2150 can be selectively detached by un-adhering the two adhesives 2115, 2117. The adhesive can be of the type which enables the two cards to be attached and detached many times before the adhesive loses its adhesiveness property.

As with other embodiments described herein, one side of the cards 2100, 2150 includes at least one magnetic stripe 2114 storing data capable of being read by a point-of-sale terminal, such as swiping or reading one of the two cards 2100, 2150 while attached or not attached to the card. The point-of-sale terminal can be, for example, a magnetic stripe reader, a smartphone, a bar code scanner, an imaging apparatus, etc.

In the case of a credit or debit card, the stored data can include the account number and name of the person the card was issued to. This information can also be displayed on a front side of the cards 2100, 2150 as shown by FIG. 21. The front side can also include the name of the issuing financial institution.

Figure 22:
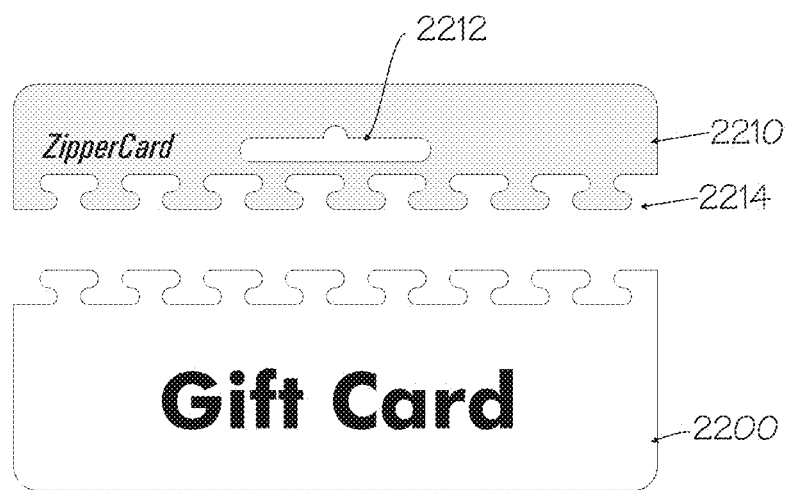
FIG. 22 is a front view of a gift card shown detached from a segment having an opening for hanging the gift card on a display rack in accordance with a tenth embodiment according to the present disclosure.
Figure 23:
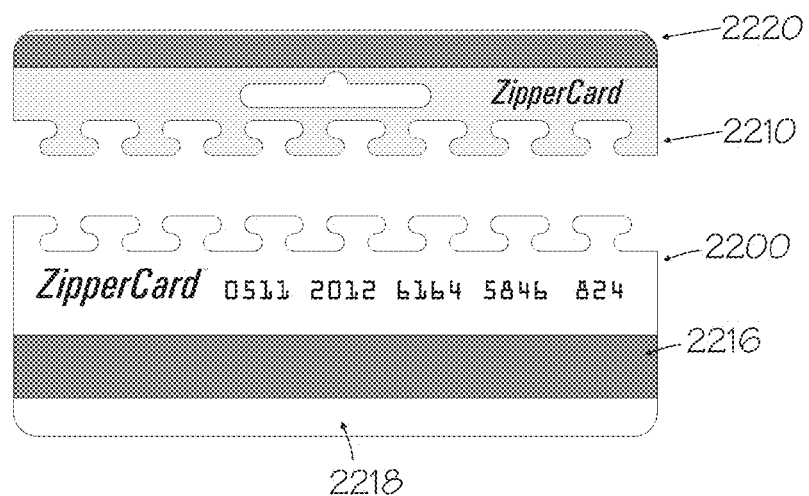
FIG. 23 is a back view of the gift card and segment shown in FIG. 22.

With reference to FIGS. 22-25, there is shown a gift card embodiment according to the present disclosure. In this embodiment, the gift card 2200 is removably attached to a portion or segment 2210 having at least one opening 2212. The opening 2212 is used to hang the card on a display rack (not shown). A tear-off configuration 2214 separates the segment 2210 from the card 2200 for separating or detaching the segment 2210 from the gift card 2200 as shown by FIGS. 22 and 23.

The tear-off configuration 2214 is in the form of a pattern, such as, e.g., a triangular teeth-like pattern or any other pattern shown in the various figures. The pattern can be used to attach the gift card 2200, once it is detached from the segment 2210, to another gift card or other card having a corresponding pattern in accordance with the present disclosure. The card 2200 can also be reattached to the segment 2210 (see FIGS. 24 and 25). The segment 2210 can also include at least one activation magnetic stripe 2220 (see FIGS. 23 and 25 which illustrate a back side of segment 2210) which is used to activate the gift card 2200, such as, for example, at a point-of-sale terminal. At least one magnetic stripe 2216 is also included on a back side 2218 of the gift card 2200.

Figure 26:
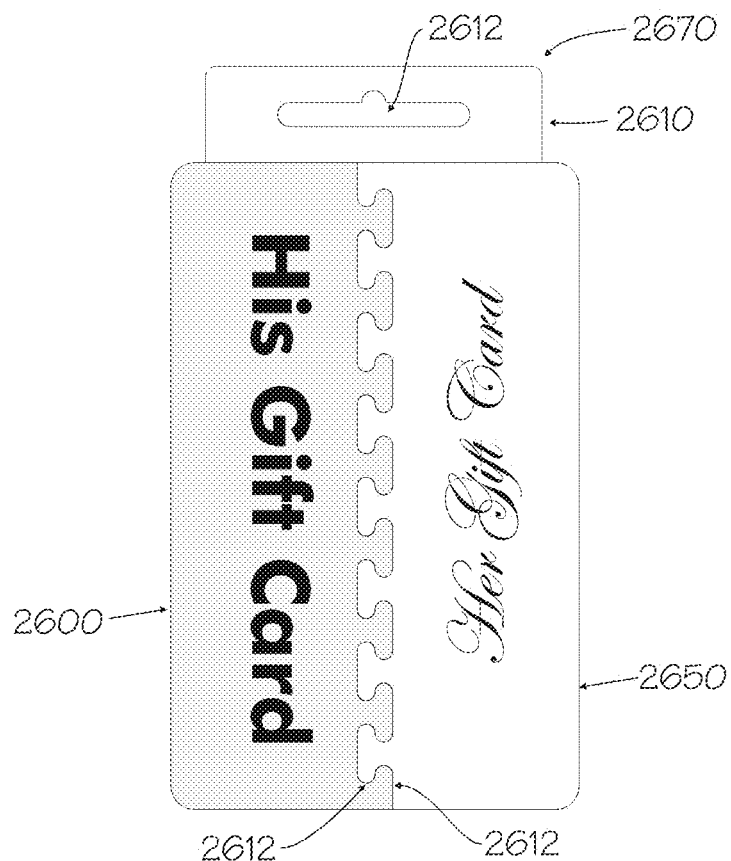
FIG. 26 illustrates two gift cards attached to each other and packaged for sale as one item in accordance with an eleventh embodiment according to the present disclosure.

In another gift card embodiment, with reference to FIG. 26, two gift cards 2600, 2650 can be packaged and sold together as one product 2670, either attached along a respective edge of each card (as shown by FIG. 26) or not attached (i.e., both cards are attached to or adhered to a backing, where the backing can having an opening for displaying the two gift cards on a display rack). Each respective edge 2612 has structure, such as a teeth-like pattern, in accordance with the teachings of the present disclosure for attaching and detaching the two gift cards 2600, 2650. Other structure for attaching and detaching the two gift cards 2600, 2650 is also contemplated, such as other structure described herein for the embodiments shown by FIGS. 17-21.

At least one of the two gift cards 2600, 2650 is attached to a portion or segment 2610 (similar to the segment 2210 described above with respect to FIGS. 22-25) having an opening 2612 for hanging the two gift cards on a display rack (not shown). Therefore, the segment 2610 can be characterized as a holder or hanger for displaying the two gift cards 2600, 2650.

The segment 2610 can include an activation magnetic stripe (not shown) on a back side of segment 2610 which is used to activate the two gift cards 2600, 2650, such as, for example, at a point-of-sale terminal. The cards 2600, 2650 can be separated from the segment 2610 by providing a tear line where the at least one of the two cards 2600, 2650 is attached to the segment 2610.

It is also contemplated to have another segment attached to gift card 2650 with a corresponding activation magnetic stripe on a back side of this segment. In this variation of the two gift card embodiment, both activation magnetic stripes can be swiped for activating each corresponding gift card, or one of the two activation magnetic stripes can be swiped for activating only one of the two gift cards, i.e., the gift card corresponding to the activation magnetic stripe which was swiped.

It is further contemplated the two gift cards 2600, 2650 complement each other, such as, for example, one gift card is for a toy store and the other gift card is for a children's clothing store, or, as shown by FIG. 26, one gift card is for a man (e.g., men's store) and the other gift card is for a woman (e.g., woman's store).

Figure 27:
FIG. 27 illustrates an identification card having structure for attaching and detaching from a holder in accordance with a twelfth embodiment according to the present disclosure.

With reference to FIG. 27, in accordance with another embodiment of the present disclosure a card 2700 having structure 2702 for attaching to a holder 2704 can be an identification card (FIG. 27) or other similar card designed to be worn by employees or others. In this embodiment, the card 2700 is attached and detached to the holder 2704 (which can have at least one clip (not shown) for fastening the holder 2704 an employee's or other person's clothing). The holder 2704 has structure 2706, e.g., a teeth-like pattern, along at least one edge 2708 for attaching/detaching the holder 2704 to the card 2700 via structure 2702, e.g., a teeth-like pattern, along at least one edge 2712.

Figure 28:
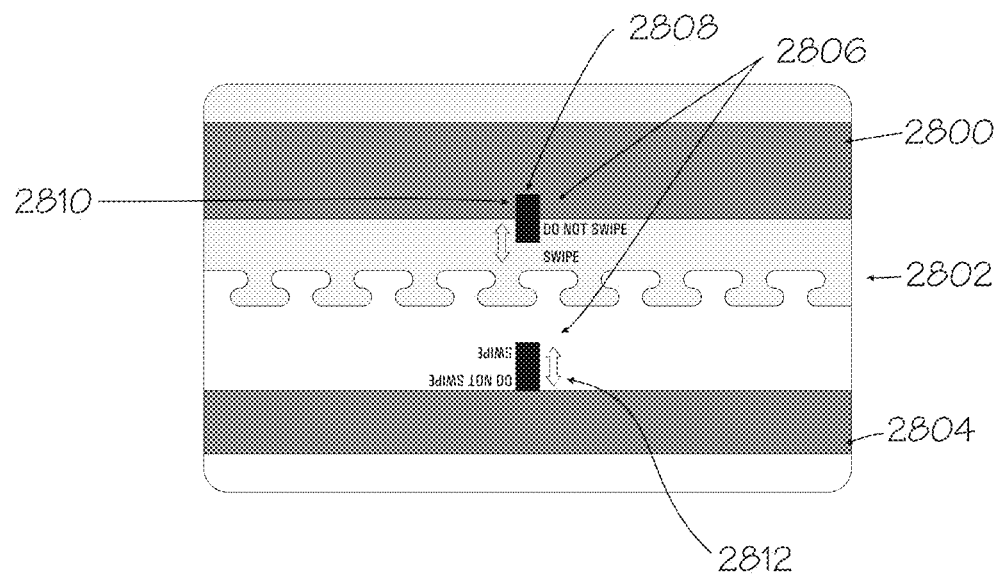
FIG. 28 illustrates a card having structure for attaching and detaching to another card and a marking mechanism according to a first embodiment for indicating which card to use for a sales transaction when the card is attached to another card in accordance with the present disclosure.

FIG. 28 illustrates a top card 2800 having structure 2802 for attaching and detaching to a bottom or another card 2804, in accordance with the teachings of the present disclosure, and a marking mechanism 2806 on each card for indicating which card to use for a sales transaction when the cards are attached. The marking mechanism 2806 includes a movable indicator 2808 capable of being moved within a track (not shown) between a first position 2810 and a second position 2812. In the first position 2810, the marking mechanism 2806 indicates the card should not be swiped. In the second position 2812, the marking mechanism 2806 indicates the card should be swiped. In FIG. 28, the marking mechanism 2806 indicates the bottom card 2804 should be swiped and the top card 2800 should not be swiped.

Figure 29:
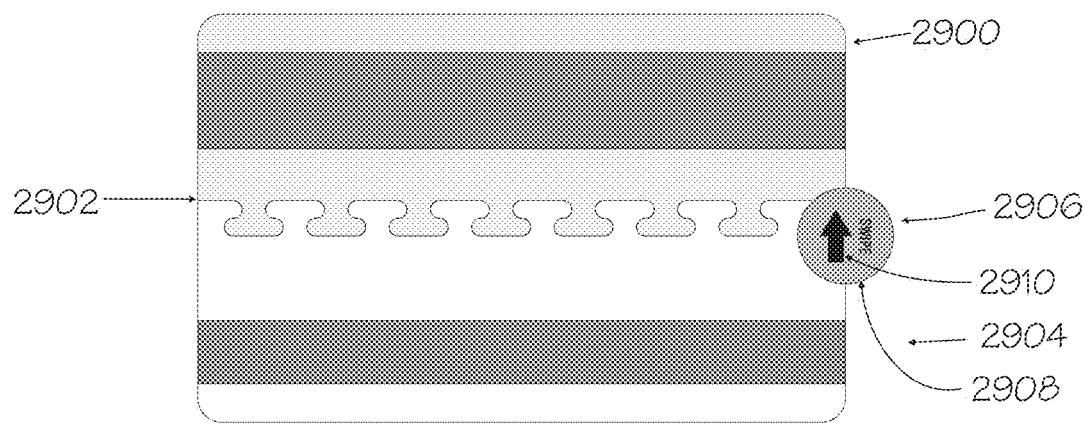
FIG. 29 illustrates a card having structure for attaching and detaching to another card and a marking mechanism according to a second embodiment for indicating which card to use for a sales transaction when the card is attached to another card in accordance with the present disclosure.

FIG. 29 illustrates a top card 2900 having structure 2902 for attaching and detaching to a bottom or another card 2904, in accordance with the teachings of the present disclosure, and a marking mechanism 2906 for indicating which card to use for a sales transaction when the cards are attached. The marking mechanism 2906 includes a rotatable indicator or pinwheel 2908 capable of being rotated, such that a pointer 2910 printed on the pinwheel 2908 points to the card desired to be swiped. In FIG. 29, the pointer 2910 indicates the top card 2900 should be swiped.

Figure 30:
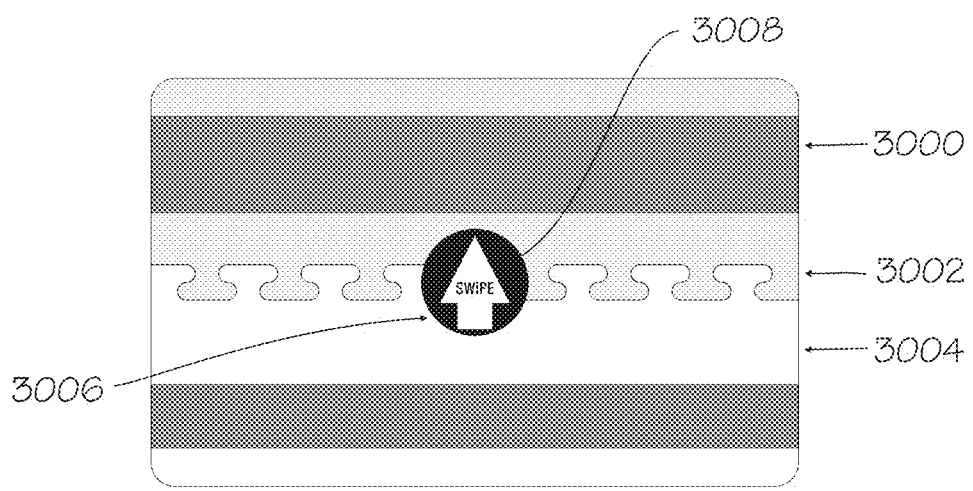
FIG. 30 illustrates a card having structure for attaching and detaching to another card and a marking mechanism according to a third embodiment for indicating which card to use for a sales transaction when the card is attached to another card in accordance with the present disclosure.

FIG. 30 illustrates a top card 3000 having structure 3002 for attaching and detaching to a bottom or another card 3004, in accordance with the teachings of the present disclosure, and a marking mechanism 3006 for indicating which card to use for a sales transaction when the cards are attached. The marking mechanism 3006 includes a rotatable pointer 3008 for being rotated to point to the card desired to be swiped. In FIG. 30, the pointer 2910 indicates the top card 3000 should be swiped.

The marking mechanisms 2906, 3006 can be removably affixed to one of the cards before or after the cards are attached.

It is contemplated, in accordance with the present disclosure, the two cards attached to each other (either by the end user or by the marketer) complement each other, such as, for example, one card is a credit card and the other card is a debit card issued by the same bank; one card is a personal credit card and the other card is a business credit card; and the two gift cards described with reference to FIG. 26 can complement each other, such as, one card is a gift card for a toy store and the other card is a gift card to a children's clothing store, or, as shown by FIG. 26, one gift card is for a man (e.g., men's store) and the other gift card is for a woman (e.g., woman's store).

The present disclosure is also directed to methods of manufacturing the various embodiments described herein. In one aspect of the present disclosure, the cards described in conjunction with FIGS. 1-16 are manufactured by one or more machines used to manufacture conventional cards having computer readable means, such as credit, debit and gift cards. The conventional cards are cut in half (or any other size) to produce two cards, such as, for example, cards 100 and 200 shown by FIG. 1 by a card-cutting machine. A stamping machine is used to create the structural members along at least one edge prior to or after the conventional cards are cut in half.

A machine can also be used which takes a conventional credit, debit or gift card and cuts the card in half (or any other size) while simultaneously or non-simultaneously stamping a pattern along at least one edge of the cut card, such as the patterns shown herein.

In other aspects of the present disclosure, a stamping machine is not used but other machines, such as for example, a machine capable of creating structure 1710 (FIG. 17) and 1910 (FIG. 19), a machine capable of affixing VELCRO® (generically, a fabric hook and loop fastener) (FIG. 20) or adhesive (FIG. 21), and a machine capable of creating lips 1811, 1811' (FIG. 18).

Figure 24:
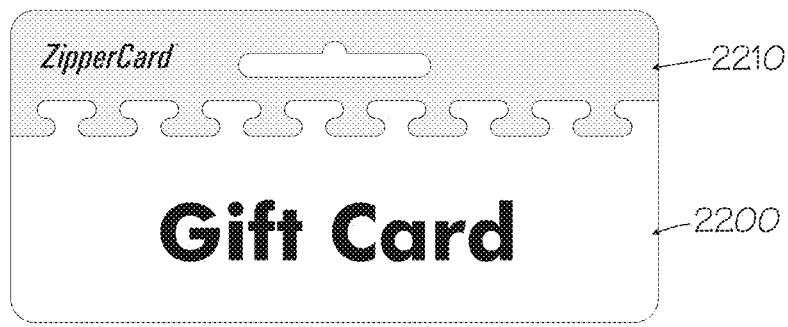
FIG. 24 is a front view of the gift card shown in FIGS. 22 and 23 attached to the segment.
Figure 25:
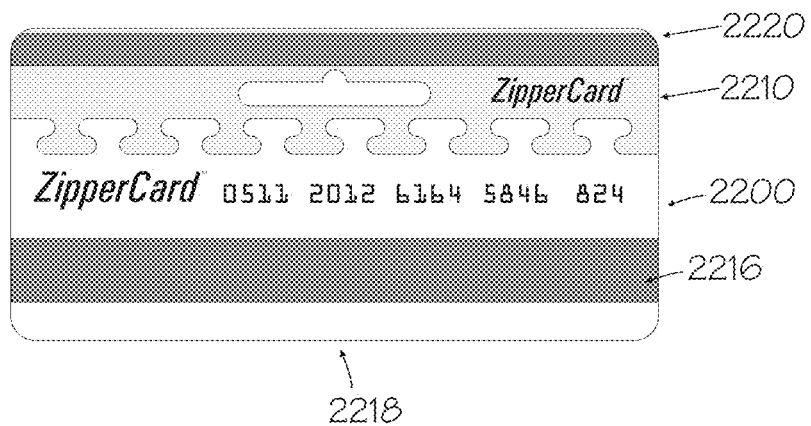
FIG. 25 is a back view of the gift card shown in FIGS. 22 and 23 attached to the segment.

In still other aspects of the present disclosure with respect to FIGS. 24-26, a stamping machine is used to stamp out the structural pattern between segment 2210 and card 2200 without separating the segment 2210 form the card 2200. The end user can then separate the two portions after purchasing the product.

Although the present disclosure has been described in considerable detail with reference to certain embodiments, other embodiments are possible and contemplated. For example, other structure may be used besides the structure described herein for attaching and detaching two cards. Therefore, the spirit and scope of the appended claims should not be limited to the description of the preferred embodiments contained therein.

What is claimed is:

1. A card comprising:
   a computer readable medium; and
   structure configured for selectively attaching and detaching the card to another card having corresponding structure, wherein the structure includes at least one structural member along a single edge for physically attaching the card to only the another card, and wherein the computer readable medium of the card stores an account number different from an account number stored on a computer readable medium of the another card.

2. The card according to claim 1, wherein the computer readable medium is selected from the group consisting of at least one magnetic stripe, UPC code, bar code, matrix barcode, and three-dimensional code, chip, and RFID tag.

3. The card according to claim 1, wherein the at least one structural member is configured to mate with a corresponding structural member of the another card.

4. The card according to claim 1, wherein the at least one structural member comprises a plurality of protrusions configured and dimensioned to interlock with concave formations on the another card.

5. The card according to claim 1, wherein the at least one structural member comprises a lip formed along at least one edge of the card.

6. The card according to claim 1, wherein the at least one structural member comprises a protrusion configured and dimensioned to interlock with a concave formation on the another card.

7. The card according to claim 1, wherein the at least one structural member comprises a strip of VELCRO®.

8. The card according to claim 1, wherein the at least one structural member comprises an adhesive.

9. The card according to claim 1, wherein the card is selected from the group consisting of credit cards, debit cards, gift cards, phone cards, parking cards, library cards, membership cards, coupon or discount cards, gift/rewards redemption cards, season pass or admissions cards, laundromat cards, car wash cards, prepaid cards, identification cards, and phone calling cards.

10. The card according to claim 1, further comprising a marking mechanism for informing a user whether to swipe the computer readable medium of the card or the computer readable medium of the another card.

11. The card according to claim 10, wherein the marking mechanism is removably attached to the card.

12. The card according to claim 1, wherein the card is a gift card.

13. The card according to claim 1, further comprising a segment having an opening for hanging the card on a display rack.

14. A combination holder and gift card product comprising:
   a gift card comprising:
      a computer readable medium; and
      structure configured for selectively attaching and detaching the gift card to another card having corresponding structure, wherein the structure includes at least one structural member along a single edge for physically attaching the card to only the another card, and wherein the computer readable medium of the gift card stores an account number different from an account number stored on a computer readable medium of the another card; and
   a holder attached to the gift card for displaying the gift card.

15. The combination holder and gift card product according to claim 14, wherein the computer readable medium is selected from the group consisting of at least one magnetic stripe, UPC code, bar code, matrix barcode, and three-dimensional code, chip, and RFID tag.

16. The combination holder and gift card product according to claim 14, wherein the at least one structural member is configured to mate with corresponding structural members of the another card.

17. The combination holder and gift card product according to claim 14, wherein the holder includes an opening for hanging the combination holder and gift card product on a display rack.

18. The combination holder and gift card product according to claim 14, wherein the at least one structural member includes a pattern formed along at least one edge of the gift card.

19. The combination holder and gift card product according to claim 14, wherein the at least one structural member comprises a plurality of protrusions configured and dimensioned to interlock with concave formations on the another card.

20. The combination holder and gift card product according to claim 14, wherein the computer readable medium is at least one magnetic stripe.

* * * * *